(12) United States Patent
Marchlewski et al.

(10) Patent No.: US 10,046,810 B1
(45) Date of Patent: Aug. 14, 2018

(54) TRUCK CARGO BED

(71) Applicant: FORD GLOBAL TECHNOLOGIES, LLC, Dearborn, MI (US)

(72) Inventors: Jack Marchlewski, Saline, MI (US); Joshua Robert Hemphill, White Lake, MI (US); Robert Reiners, Grosse Ile, MI (US); Dragan B. Stojkovic, Taylor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/622,887

(22) Filed: Jun. 14, 2017

(51) Int. Cl.
*B62D 33/023* (2006.01)
*B62D 33/03* (2006.01)
*B62D 29/00* (2006.01)
*B62D 33/027* (2006.01)

(52) U.S. Cl.
CPC ......... *B62D 33/023* (2013.01); *B62D 29/008* (2013.01); *B62D 33/0273* (2013.01); *B62D 33/03* (2013.01)

(58) Field of Classification Search
CPC .. B62D 33/023; B62D 33/0273; B62D 33/03; B62D 33/02; B62D 25/2036; B62D 25/2054
USPC ........................................... 296/183.1, 184.1
See application file for complete search history.

(56) References Cited

U.S. PATENT DOCUMENTS

| | | | | |
|---|---|---|---|---|
| 4,826,233 A | * | 5/1989 | Hagenbuch | B60P 1/286 266/165 |
| 5,660,427 A | * | 8/1997 | Freeman | B62D 29/001 296/183.1 |
| 6,293,617 B1 | | 9/2001 | Sukegawa | |
| 6,293,618 B1 | | 9/2001 | Sukegawa et al. | |
| 7,080,868 B2 | * | 7/2006 | McClure | B62D 25/04 296/146.11 |
| 9,073,586 B1 | * | 7/2015 | Courtright | B62D 29/008 |
| 9,145,176 B1 | * | 9/2015 | Van Wyk | B62D 29/008 |
| 2002/0043814 A1 | * | 4/2002 | Weiman | B62D 21/09 296/29 |
| 2003/0218360 A1 | * | 11/2003 | Henderson | B62D 33/02 296/182.1 |
| 2004/0262950 A1 | * | 12/2004 | Bhat | B62D 25/2054 296/183.1 |
| 2005/0236867 A1 | * | 10/2005 | McNulty | B62D 25/16 296/183.1 |
| 2006/0087153 A1 | * | 4/2006 | Lendway, IV | B62D 25/2054 296/187.01 |
| 2007/0085381 A1 | * | 4/2007 | Delaney | B62D 25/04 296/193.08 |
| 2007/0267896 A1 | * | 11/2007 | Werner | B62D 33/02 296/203.04 |
| 2009/0115222 A1 | * | 5/2009 | Hohnl | B60Q 1/30 296/183.1 |
| 2010/0244497 A1 | | 9/2010 | Honda et al. | |

(Continued)

*Primary Examiner* — Gregory A Blankenship
(74) *Attorney, Agent, or Firm* — Jason Rogers; Brooks Kushman P.C.

(57) ABSTRACT

A vehicle includes a truck bed. The truck bed includes a side member, cross-member, and an extruded member. The side member has an upward extending pillar that defines a central cavity. The cross-member forms a cradle and extends laterally toward the pillar. The extruded member is secured to the cross-member within the cradle, extends laterally outward from the cross-member into the central cavity, and is secured to the pillar within the central cavity.

18 Claims, 3 Drawing Sheets

(56) References Cited

U.S. PATENT DOCUMENTS

2011/0188979 A1* 8/2011 Ketels .................. B60P 1/00
  414/519
2018/0001938 A1* 1/2018 Higgins ............... B62D 25/025

* cited by examiner

TRUCK CARGO BED

TECHNICAL FIELD

The present disclosure relates to vehicles, such as trucks, that include cargo beds and tailgates that provide access to the cargo beds.

BACKGROUND

Pickup trucks include cargo beds that are configured to received and store cargo being transported. Tailgates may be included to provide access to the cargo beds.

SUMMARY

A vehicle includes a truck bed. The truck bed includes a side member, cross-member, and an extruded member. The side member has an upward extending pillar that defines a central cavity. The cross-member forms a cradle and extends laterally toward the pillar. The extruded member is secured to the cross-member within the cradle, extends laterally outward from the cross-member into the central cavity, and is secured to the pillar within the central cavity.

A truck bed includes a rear sill, first upward extending pillar, second upward extending pillar, floor panel, and an extruded coupler. The rear sill forms a cradle and extends between the first upward extending pillar and second upward extending pillar. The floor panel is secured to a top of the sill. The extruded coupler is secured to the sill within the cradle between the sill and the floor panel. A portion of the extruded coupler extends laterally outward from an end of the sill and is secured to the first pillar.

A truck bed includes an upward extending pillar, cross-member, floor panel, and extruded member. The cross-member forms a cradle. The floor panel is secured to a top of the cross-member such that the cradle forms a first cavity therebetween. The extruded member is secured to the cross-member within the first cavity. A portion of the extruded member extends laterally outward from an end of the cross-member and is secured to the pillar.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
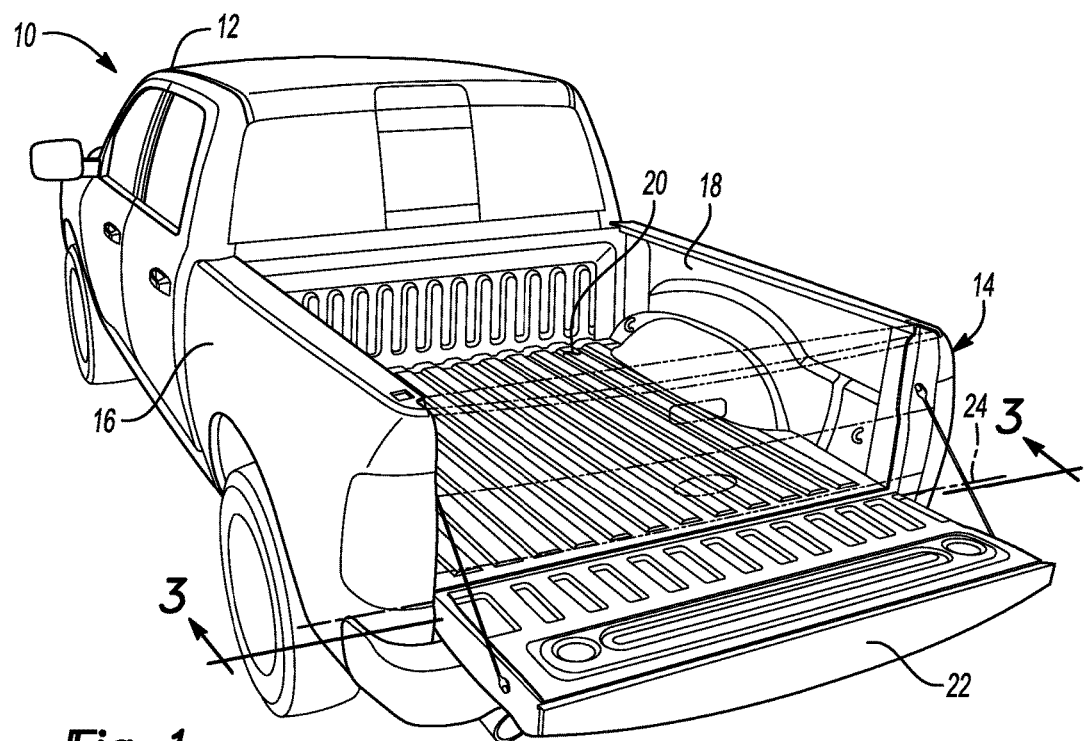
FIG. 1 is a perspective view of a vehicle, such as a truck, having a cargo or truck bed.

Referring to FIG. 1, a perspective view of vehicle 10 is illustrated. The illustrated vehicle 10 may be a truck. The vehicle 10 may include a body 12 (that includes a cabin space) and a truck bed (or cargo bed) 14. The body 12 and the truck bed 14 may each be secured to a frame. The truck bed 14 has a first side member 16 and a second side member 18 that extend upward from a floor panel 20. A tailgate 22 provides access to the truck bed 14. The tailgate 22 may be rotatably secured to the truck bed 14 proximate to the floor panel 20 such that the tailgate is rotatable relative to the truck bed 14 along an axis 24, which may be a horizontal or a horizontally extending axis, that extends laterally between the first side member 16 and second side member 18. The tailgate 22 is shown to be in a downward and opened position in solid lines and in an upward and closed position in phantom lines. The body 12 and truck bed 14 may include various components of the vehicle's body-in-white structure. The body-in-white structure may include roof rails, pillars (such as A-pillars, B-pillars, C-pillars, D-pillar, etc.), side rails, front rails, rear rails, rocker panels, strut or shock towers, roof cross members, floor cross members, floor panels, roof panels, firewalls, radiator core supports, powertrain component supports (e.g., engine or transmission supports), or any other component of the vehicle body-in-white structure or the frame known in the art. The body components may be connected to each other by a welding process or by fasteners, such as rivets, screws, bolts, or any other type of faster known to a person of ordinary skill in the art.

Figure 2:
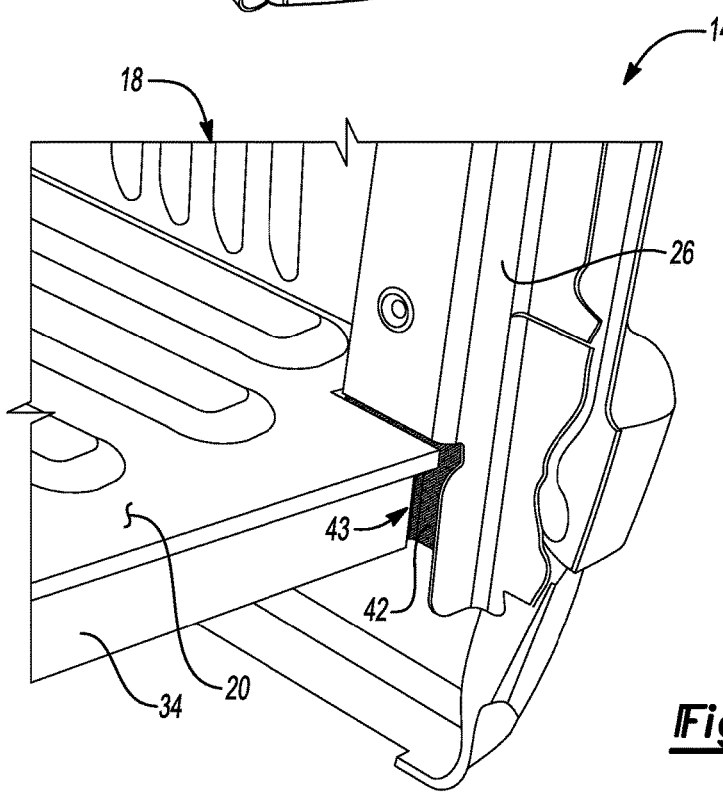
FIG. 2 is a magnified view of a rear corner of the truck bed with the tailgate removed.
Figure 3:
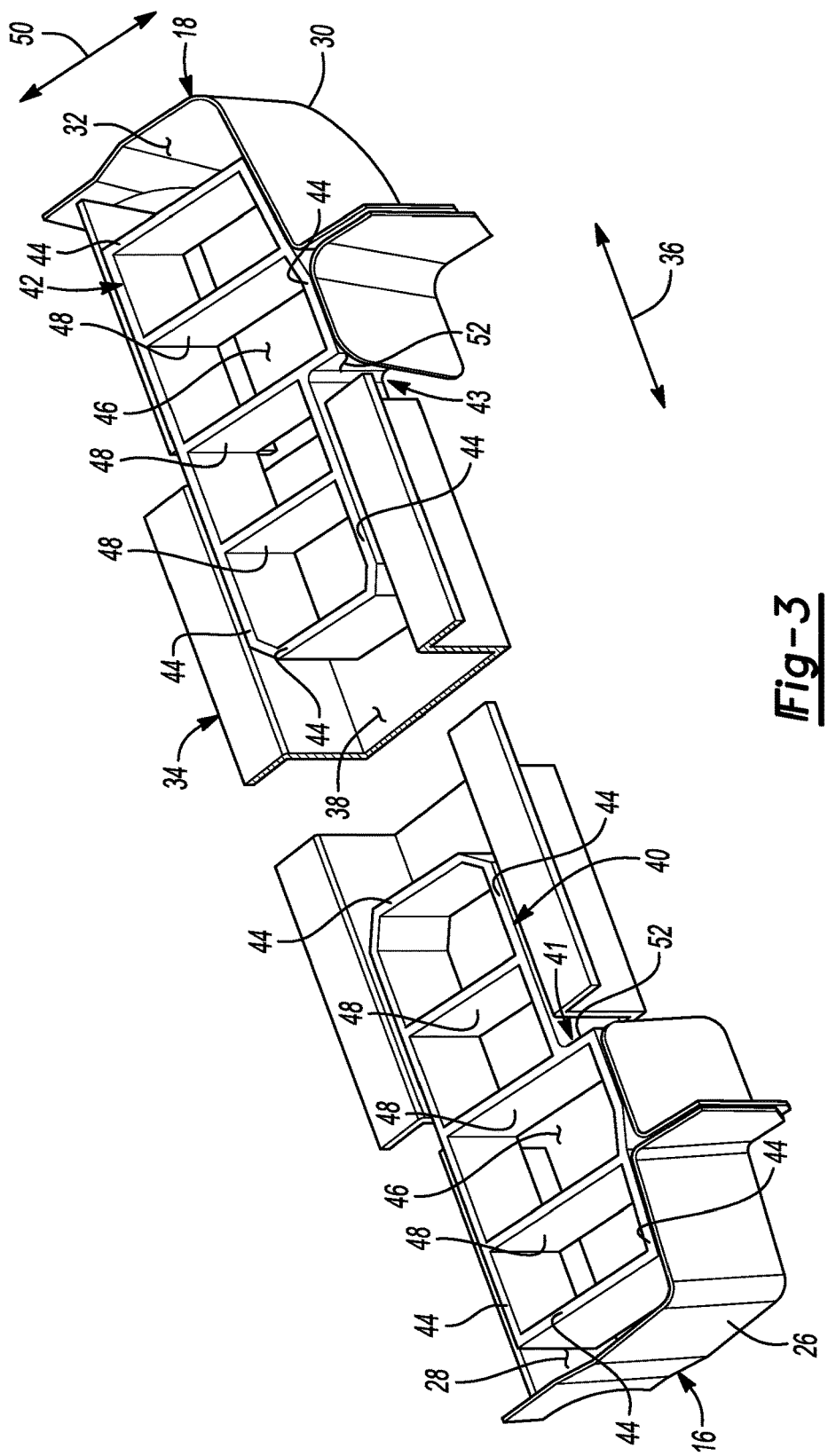
FIG. 3 is a cross-sectional view taken along line 3-3 in FIG. 1 with the tailgate removed.

Referring to FIGS. 2 and 3, a magnified view of a rear corner of the truck bed 14 with the tailgate 22 removed and a cross-sectional view taken along line 3-3 in FIG. 1 with the tailgate 22 removed are illustrated, respectively. The first side member 16 has a first upward extending pillar (or column) 26 that defines a central cavity 28. The second side member 18 has a second upward extending pillar (or column) 30 that defines a central cavity 32. A cross-member 34 extends laterally towards each of and between the first upward extending pillar 26 and the second upward extending pillar 30. More specifically, the cross-member 34 may extend in a lateral direction 36 relative to the vehicle 10 or truck bed 14. The cross-member 34 may be a rear sill that is positioned at the rear end truck bed 14 proximate the tailgate 22. The first upward extending pillar 26 and the second upward extending pillar 30 may each be D-pillars positioned at the rear end of the truck bed 14 proximate the tailgate 22. The cross-member 34 may form a downward extending depression or upward facing cradle 38. A cradle may refer to a framework which supports or protects something. The floor panel 20 is secured to a top of the cross-member 34 such that the cradle 38 forms a cavity between the floor panel 20 and the cross-member 34.

A first extruded member (or coupler) 40 may be secured to the cross-member 34 within the cradle 38 between the cross-member 34 and the floor panel 20. Alternatively, it may be stated that the first extruded member 40 is secured to the cross-member 34 within the cavity formed by the cradle 38 between the floor panel 20 and the cross-member 34. A portion of the first extruded member 40 may extend laterally outward from an end of the cross-member 34. More specifically, the portion of the first extruded member 40 may extend outward from the end of the cross-member 34 in the lateral direction 36. The portion of the second extruded member 40 that extends laterally outward from the end of the cross-member 34 may be secured to the first upward extending pillar 26. More specifically, the portion of the first extruded member 40 that extends laterally outward from the end of the cross-member 34 may extend through a cutout 41 defined in the first upward extending pillar and into the central cavity 28. The first extruded member 40 may then be secured to the first upward extending pillar 26 within the central cavity 28.

A second extruded member (or coupler) 42 may be secured to the cross-member 34 within the cradle 38 between the cross-member 34 and the floor panel 20. Alternatively, it may be stated that the second extruded member 42 is secured to the cross-member 34 within the cavity formed by the cradle 38 between the floor panel 20 and the cross-member 34. A portion of the second extruded member 42 may extend laterally outward from an end of the cross-member 34. More specifically, the portion of the second extruded member 42 may extend outward from the end of the cross-member 34 in the lateral direction 36. The portion of the second extruded member 42 that extends laterally outward from the end of the cross-member 34 may be secured to the second upward extending pillar 30. More specifically, the portion of the second extruded member 42 that extends laterally outward from the end of the cross-member 34 may extend through a cutout 43 in the second upward extending pillar 30 and into the central cavity 32. The second extruded member 42 may then be secured to the second upward extending pillar 30 within the central cavity 32.

The first extruded member 40 and the second extruded member 42 each include upward extending outer peripheral walls 44 that form closed loops that define an internal cavity 46. The first extruded member 40 and the second extruded member 42 may each include at least one longitudinally extending rib 48 that spans the internal cavity 46 between opposing sides of the outer peripheral wall 44. More specifically, the ribs 48 may extend in a longitudinal direction 50 relative to the vehicle 10 or truck bed 14.

The first extruded member 40 may include an offset 52 such that a portion of the first extruded member 40 that is secured to the cross-member 34 within the cradle 38 has a smaller longitudinally extending width (i.e., the width in the longitudinal direction 50) relative to a second portion of the first extruded member 40 that is secured to the first upward extending pillar 26 within the central cavity 28. Alternatively, it may be stated that the portion of the first extruded member 40 that has a smaller longitudinally extending width is disposed within the cavity formed by the cradle 38 between the floor panel 20 and the cross-member 34.

The second extruded member 42 may also include an offset 52 such that a portion of the second extruded member 42 that is secured to the cross-member 34 within the cradle 38 has a smaller longitudinally extending width (i.e., the width in the longitudinal direction 50) relative to a second portion of the second extruded member 42 that is secured to the second upward extending pillar 30 within the central cavity 32. Alternatively, it may be stated that the portion of the second extruded member 42 that has a smaller longitudinally extending width is disposed within the cavity formed by the cradle 38 between the floor panel 20 and the cross-member 34.

Figure 4:
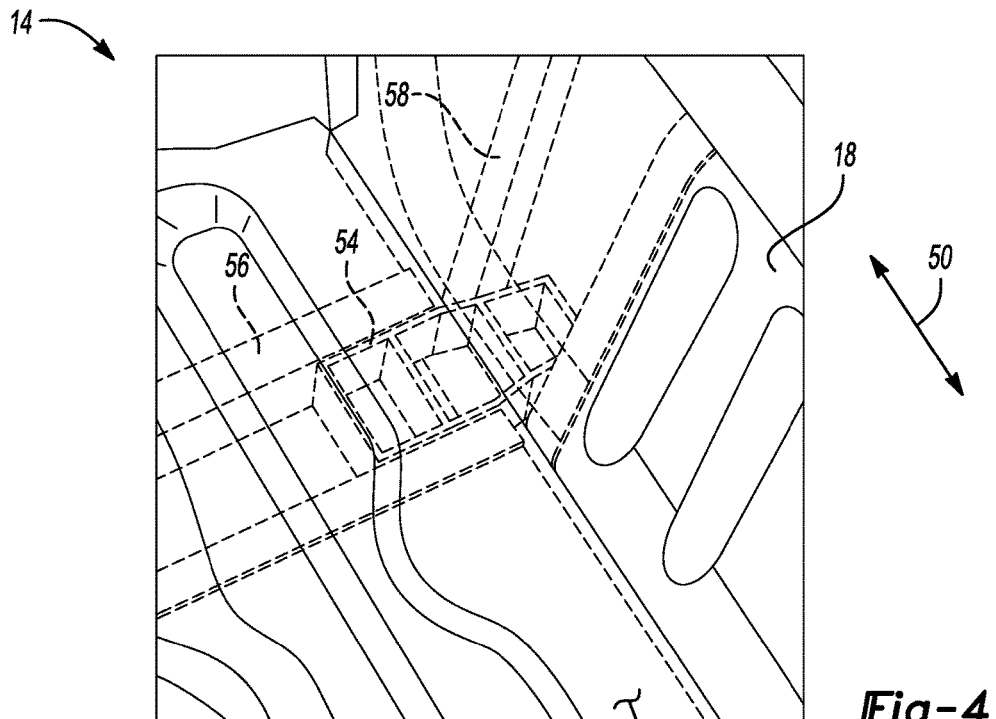
FIG. 4 is a magnified view of a portion of the truck bed proximate to a wheel well.
Figure 5:
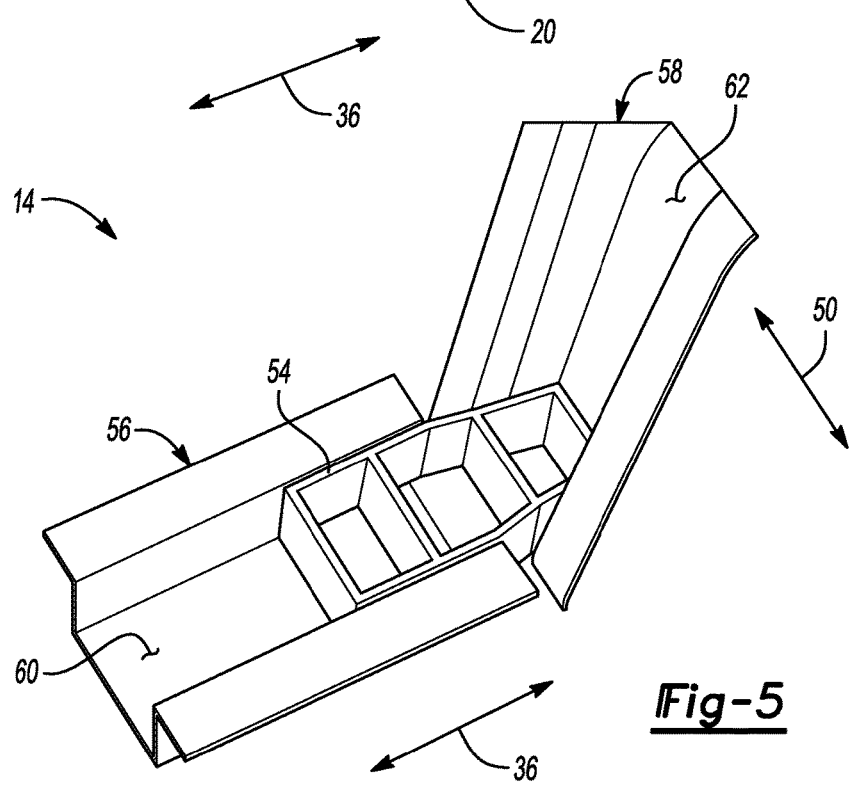
FIG. 5 is a magnified view of the portion of the truck bed proximate to the wheel well with the external panels removed for illustrative purposes.

Referring to FIGS. 4 and 5, a magnified view of a portion of the truck bed 14 proximate to a wheel well and a magnified view of the portion of the truck bed proximate to the wheel well with the external panels removed are illustrated, respectively. An alternative embodiment of an extruded member (or coupler) 54 that is secured to both a cross-member 56 and a pillar 58 is illustrated. The configuration of the extruded member (or coupler) 54, cross-member 56, and pillar 58 should be construed to have all of the characteristics and attributes as the extruded members 40, 42, pillars 26, 30, and cross-member 34 configuration described in FIGS. 2 and 3 unless described otherwise herein. The extruded member 54 is secured to the cross-member 56 within a cradle 60 formed by the cross-member 56. The extruded member 54 extends laterally outward from an end of the cross-member 56 and into a second cradle 62 formed by the pillar 58. The extruded member 54 has a longitudinally extending width (i.e., the width in the longitudinal direction 50) that tapers as the extruded member 54 extends laterally outward (i.e., in the lateral direction 36) and into the second cradle 62 formed by the pillar 58.

The configuration of the extruded members that connect cross-members of the truck bed 14 to side pillars of the truck bed 14 should not be construed as limited to the embodiments described herein. For example, the extruded members may be utilized at any of the joints on the truck bed 14 where a cross-member is secured to a pillar. The form or shape of the extruded members should also not be construed as limited to the embodiments described herein. For example, the extruded members may not taper, may not have an offset, may not include internal ribs, etc.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
 a truck bed including,
  a side member having an upward extending pillar that defines a central cavity,
  a cross-member forming a cradle and extending laterally toward the pillar, and
  an extruded member secured to the cross-member within the cradle, extending laterally outward from the cross-member into the central cavity, and secured to the pillar within the central cavity.

2. The vehicle of claim 1, wherein the extruded member includes an upward extending outer peripheral wall that forms a closed loop defining a second cavity.

3. The vehicle of claim 2, wherein the extruded member includes at least one longitudinally extending rib that spans the second cavity between opposing sides of the outer peripheral wall.

4. The vehicle of claim 1, wherein the extruded member includes an offset such that a first portion of the extruded member that is secured to the cross-member within the cradle has a smaller longitudinally extending width relative to a second portion of the extruded member that is secured to the pillar within the central cavity.

5. The vehicle of claim 4 further comprising a floor panel secured to a top of the cross-member such that the cradle forms a second cavity therebetween, wherein the first portion of the extruded member is disposed within the second cavity.

6. The vehicle of claim 1, wherein the pillar defines a cutout that accesses the central cavity and the extruded member laterally extends into the central cavity via the cutout.

7. The vehicle of claim 1, wherein the cross-member is a rear sill of the truck bed and the pillar is a D-pillar.

8. The vehicle of claim 1, wherein the extruded member has a longitudinally extending width that tapers as the extruded member extends laterally outward.

9. A truck bed comprising:
a rear sill forming a cradle and extending between first and second upward extending pillars, the first pillar defining a central cavity;
a floor panel secured to a top of the sill; and
an extruded coupler secured to the sill within the cradle between the sill and the floor panel, wherein a portion of the extruded coupler extends laterally outward from an end of the sill, extends into the central cavity, and is secured to the first pillar.

10. The truck bed of claim 9, wherein the extruded coupler includes an upward extending outer peripheral wall that forms a closed loop defining a second cavity.

11. The truck bed of claim 10, wherein the extruded coupler includes at least one longitudinally extending rib that spans the second cavity between opposing sides of the outer peripheral wall.

12. The truck bed of claim 9, wherein the extruded coupler includes an offset such that a first portion of the extruded coupler that is secured to the rear sill within the cradle has a smaller longitudinally extending width relative to a second portion of the extruded coupler that extends into the central cavity.

13. The truck bed of claim 9 further comprising a second extruded coupler secured to the rear sill within the cradle between the sill and the floor panel, wherein a portion of the extruded coupler extends laterally outward from a second end of the sill and is secured to the second pillar.

14. The truck bed of claim 13, wherein the second pillar defines a second central cavity and the second extruded coupler extends laterally outward from the rear sill into the second central cavity.

15. A truck bed comprising:
an upward extending pillar defining a central cavity;
a cross-member forming a cradle;
a floor panel secured to a top of the cross-member such that the cradle forms a first cavity therebetween; and
an extruded member secured to the cross-member within the first cavity, wherein a portion of the extruded member extends laterally outward from an end of the cross-member, extends into the central cavity, and is secured to the pillar.

16. The truck bed of claim 15 wherein the extruded member includes an upward extending outer peripheral wall that forms a closed loop defining a third cavity.

17. The truck bed of claim 16, wherein the extruded member includes an offset such that a first portion of the extruded member that is secured to the cross-member within the first cavity has a smaller longitudinally extending width relative to a second portion of the extruded member that extends into the central cavity.

18. The truck bed of claim 15, wherein the extruded member has a longitudinally extending width that tapers as the extruded member extends laterally outward.

* * * * *